(12) United States Patent
Menard et al.

(10) Patent No.: US 8,636,179 B2
(45) Date of Patent: Jan. 28, 2014

(54) APPARATUS FOR DISPENSING A METERED QUANTITY OF CARBONATED BEVERAGE

(75) Inventors: Auguste Menard, Swindon (GB); Justin Walshe, Minety (GB); Paul Smith, Hertford (GB); Guy Hansson, Harlow (GB)

(73) Assignee: Diageo Great Britain Limited (GB)

( * ) Notice: Subject to any disclaimer, the term of this patent is extended or adjusted under 35 U.S.C. 154(b) by 812 days.

(21) Appl. No.: 12/671,568

(22) PCT Filed: Jun. 24, 2008

(86) PCT No.: PCT/GB2008/002160
§ 371 (c)(1),
(2), (4) Date: Mar. 17, 2010

(87) PCT Pub. No.: WO2009/019416
PCT Pub. Date: Feb. 12, 2009

(65) Prior Publication Data
US 2010/0213219 A1     Aug. 26, 2010

(30) Foreign Application Priority Data
Aug. 6, 2007 (GB) .................................. 0715265.5

(51) Int. Cl.
*G01F 11/28* (2006.01)
(52) U.S. Cl.
USPC ............ 222/442; 222/1; 222/146.6; 222/339; 222/453; 222/481.5
(58) Field of Classification Search
USPC ................. 222/425, 442, 444, 453, 456, 399, 222/400.7, 1, 146.6, 129, 481.5, 158, 518; 141/319–322, 351, 360, 362; 99/323.1, 99/323.2
See application file for complete search history.

(56) References Cited

U.S. PATENT DOCUMENTS

| | | | | |
|---|---|---|---|---|
| 3,788,343 A | * | 1/1974 | Neidorf et al. | 137/209 |
| 3,802,606 A | * | 4/1974 | Gust | 222/484 |
| 4,005,807 A | * | 2/1977 | Wiesner | 222/442 |
| 4,089,353 A | * | 5/1978 | Antonelli | 141/302 |
| 4,210,262 A | * | 7/1980 | Donaldson | 222/442 |

(Continued)

FOREIGN PATENT DOCUMENTS

| | | | |
|---|---|---|---|
| EP | 1 598 311 A1 | 11/2005 | |
| EP | 1864943 A1 * | 12/2007 | ............... B67D 3/02 |
| WO | 9824553 A1 | 8/1995 | |
| WO | 2008044920 A1 | 4/2008 | |

OTHER PUBLICATIONS

GB Examination Report Dated Dec. 19, 2011, Application No. GB0715265.5, 4 Pages.

(Continued)

*Primary Examiner* — Frederick C Nicolas
(74) *Attorney, Agent, or Firm* — Brooks Kushman P.C.

(57) ABSTRACT

An apparatus for dispensing a carbonated beverage includes a sub-chamber (12) that communicates with a main container (11). In use, prior to filling the sub-chamber (12) it is pressurised to greater than or equal to the equilibrium pressure required to keep the dissolved gas in solution. This has the effect that the beverage does not froth out of a dispenser nozzle. It also has the effect of keeping beverage in the main container (11) from losing carbonation. The invention has particular application to "Optic" devices for dispensing carbonated spirit drinks.

10 Claims, 4 Drawing Sheets

(56) References Cited

U.S. PATENT DOCUMENTS

| | | | |
|---|---|---|---|
| 4,392,578 A * | 7/1983 | Fipp et al. | 215/231 |
| 4,509,569 A * | 4/1985 | Adolfsson | 141/360 |
| 4,588,536 A * | 5/1986 | Adolfsson | 261/121.1 |
| 4,637,438 A * | 1/1987 | Weiss | 141/6 |
| 4,655,124 A * | 4/1987 | Child | 99/323.2 |
| 5,097,991 A * | 3/1992 | Lance | 222/442 |
| 5,150,743 A * | 9/1992 | Walusiak | 141/147 |
| 5,226,463 A * | 7/1993 | Mette et al. | 141/39 |
| 5,826,748 A | 10/1998 | Qian et al. | |
| 5,909,824 A * | 6/1999 | Qian et al. | 222/1 |
| 6,439,549 B1 * | 8/2002 | Loov | 261/121.1 |
| 6,454,142 B1 | 9/2002 | Meynet | |
| 6,463,964 B2 * | 10/2002 | Clusserath | 141/40 |
| 7,287,670 B2 * | 10/2007 | Yoshida et al. | 222/1 |
| 2010/0006592 A1 * | 1/2010 | Maas et al. | 222/1 |

OTHER PUBLICATIONS

PCT International Search Report Dated May 12, 2008, Application No. PCT/GB/002160, 2 Pages.

* cited by examiner

US 8,636,179 B2

APPARATUS FOR DISPENSING A METERED QUANTITY OF CARBONATED BEVERAGE

TECHNICAL FIELD

The present invention relates to an apparatus for dispensing a carbonated beverage, particularly as suitable for delivering a "shot" of beverage to a glass.

BACKGROUND ART

Dispensers for delivering a predefined volume of beverage are well known. A common example is an "Optic" (registered trade mark of Gaskell and Chambers Limited) device fitted to an inverted spirit bottle (e.g. gin, whiskey, etc). Such a device includes a small chamber of measured volume with a spring-loaded mechanism that closes communication between the chamber and bottle as the chamber is opened to release its measured volume under gravity into a glass. As the chamber closes to the outside environment communication with the bottle is again opened, filling the volume ready for its next use.

A conventional Optic is not suited for use with carbonated beverages because the empty chamber is effectively at atmospheric pressure when it is opened to communication with the bottle. The pressure drop on the beverage as it flows to the chamber causes the gas to bubble out of solution and subsequently lose carbonation and perceived loss in product quality over time. Furthermore, the pressurised liquid in the chamber is prone to squirting when being dispensed rather than pouring smoothly.

DISCLOSURE OF THE INVENTION

The present invention seeks to minimise gas loss and improve product quality by providing an apparatus adapted for dispensing a carbonated beverage.

In one broad aspect of the present invention there is provided an apparatus for dispensing a carbonated beverage including a sub-chamber adapted to communicate with a main container via a first valve wherein, in use, prior to filling the sub-chamber, the sub-chamber has an internal pressure greater than or equal to the equilibrium pressure required to keep the dissolved gas in solution.

In a preferred form the sub-chamber is closed to the main container after filling such that, when the sub-chamber is emptied, minimal gas from the container is lost to the atmosphere.

The present invention allows a shot of carbonated beverage to be delivered smoothly from the sub-chamber by pre-pressurising that chamber to, for example, equal to the headspace of the container before beverage flows into said sub-chamber. After the sub-chamber is full of beverage it is then isolated from the container and the gas pressure reduced toward atmospheric. Finally, the sub-chamber can be opened to allow beverage to flow smoothly out, without squirting or other symptoms associated with gas quickly coming out of solution.

MODE(S) FOR CARRYING OUT THE INVENTION

Figures 1, 2:
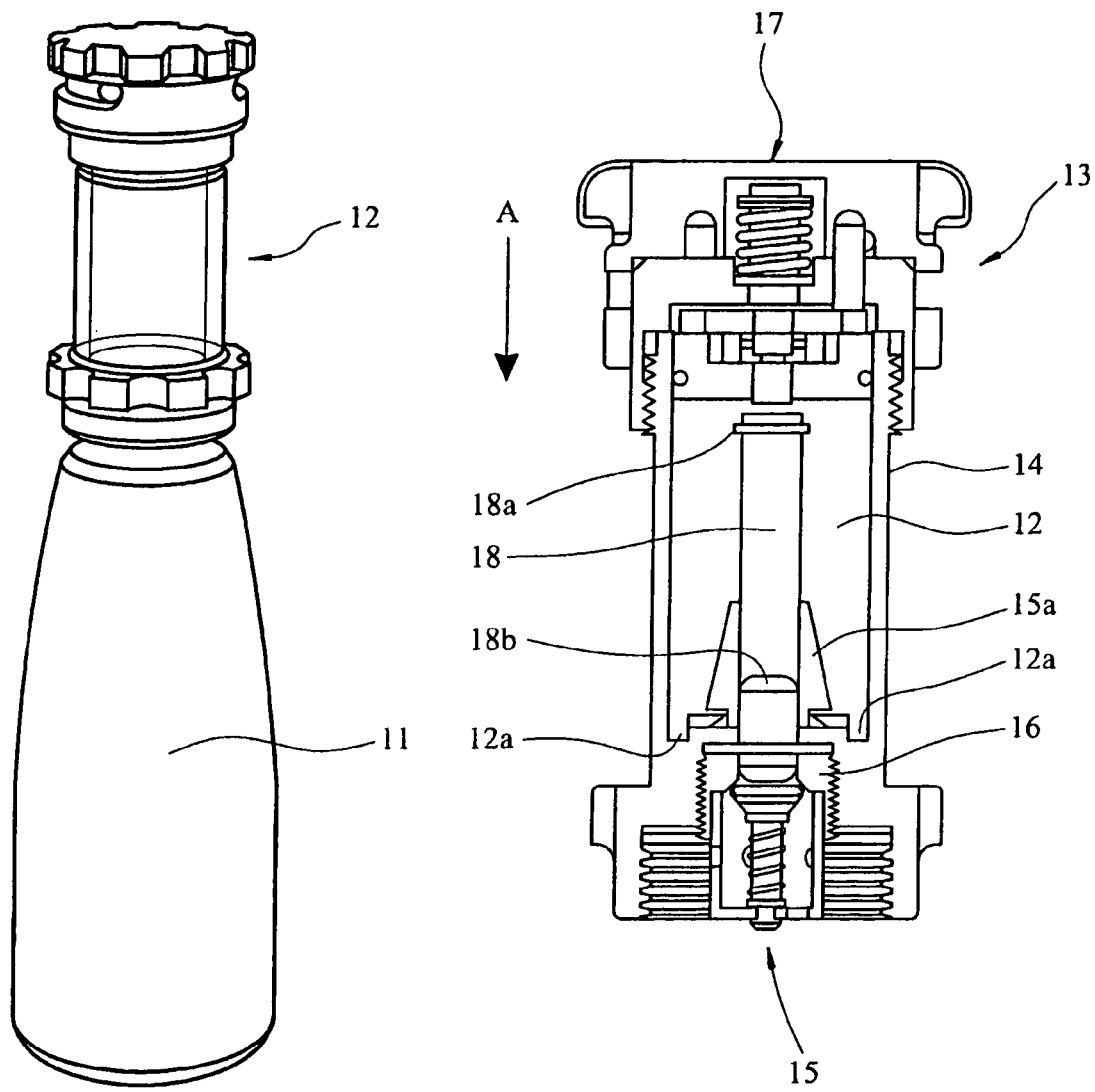
FIG. 1 is a general view of a first embodiment of apparatus according to the invention.
FIG. 2 is a section view of a sub-chamber from FIG. 1.

FIGS. 1 and 2 illustrate a first embodiment of the invention that is intended to be an apparatus purchased by a consumer for home use. Accordingly, the consumer purchases a main beverage container 11 substantially filled with carbonated beverage (e.g. a carbonated spirit alcoholic drink) that is also supplied with a sub-chamber assembly 12. Detail of the sub-chamber 12 is best shown in FIG. 2.

Sub-chamber 12 includes, a lid 13 threadingly engaged with a cylindrical sidewall 14 and a bottle connection end 15, adapted to receive the threaded neck of a bottle (main container 11).

Container 11 may be of a number of designs and materials but generally must hold a carbonated beverage and any associated pressures.

The bottle connection end 15 includes a stop valve 16 that controls flow of liquid and gas from container 11. Stop valve 16 is acted upon by a spring-biased mechanism 17 in the lid 13 via a central pin (hollow shaft) 18 within sub-chamber 12.

When sub-chamber 12 is in place threaded onto a bottle neck, even with lid 13 removed, the beverage within container 11 is isolated from the outside atmosphere. When lid 13 is in place and screwed in the direction of arrow A it first seals sub-chamber 12 to the outside atmosphere and then pushes on pin 18 to open valve 16.

Opening of valve 16 (which is gradual as lid 13 moves further onto its thread) opens the sub-chamber 12 into fluid communication with the headspace of container 11 via vent hole 18b in pin 18. The sub-chamber 12 is accordingly pressurised to the same gas pressure as container 11 by the pressure difference in the pack, lifting a weight 15a off the valve seat and equalising the pressure.

The entire apparatus: main container 11 and sub-chamber 12, is then inverted to allow liquid to flow under gravity through valve 16, thereby filling sub-chamber 12 with carbonated beverage. By virtue of the equalised pressure beverage moves through the valve without causing gas breakout. As the pack is inverted, weight 15a (in the form of an annular collar around shaft 18) slides along pin shaft 18 and rests against a stopper collar 18a allowing beverage to run into sub-chamber 12 through hole 18a in hollow shaft 18.

Furthermore, the gas (e.g. air) that was in the empty sub-chamber 12 is able to flow through vent hole 18b into container 11 to replace the volume of the leaving liquid.

When the apparatus reverts to an upright (FIG. 1) position, a one-way valve feature of connector end 15 prevents backflow of beverage into container 11. Specifically, the triangle or cone-shaped weight 15a seats onto the opening to main container 11 (vent hole 18b) and provides this one-way valve feature, i.e. when returned to its upright position, weight 15a drops back onto the valve seat and prevents backflow into container 11.

In order to ensure sub-chamber 12 is not completely filled with liquid during inversion an annular groove 12a is provided adjacent the bottle connection end 15. It will be clear that, in an inverted position (i.e. FIG. 2 upside-down), groove 12a traps a pocket of air therewithin. As such, when the container is returned to an upright position, a headspace is created in chamber 12.

Beverage is now ready to be dispensed from sub-chamber 12.

As lid 13 is unscrewed pin 18 withdraws, sealing valve 16 and isolating sub-chamber 12 from container 11. The unscrewing action of lid 13 effectively increases the internal volume of sub-chamber 12, reducing the head pressure in a smooth transition.

Finally, as lid 13 is removed the sub-chamber 12 is completely vented to atmosphere. The headspace formed as a result of the annular groove 12a ensures that gas is vented to atmosphere before any liquid. This avoids any uncontrolled spurting of beverage out of the sub-chamber 12. The beverage may be poured into a glass or other receptacle.

The main container remains sealed.

The foregoing procedure can be contrasted with a conventional carbonated beverage container with a screw cap. Each time the cap is removed the entire headspace is suddenly dropped to atmospheric pressure. Product quality (perceived "fizziness") degrades over time.

Venting the entire headspace of the container to atmosphere is particularly undesirable in carbonated beverages that cannot hold carbonation well under atmospheric conditions, such as carbonated spirits.

The apparatus of FIGS. 1 and 2, intended for take-home use by consumers, could be modified in several ways. In an alternative form the sub-chamber 12 may be integral with the main chamber 11 (there is no reason why it must be detachable at connection end 15 except for re-use). Furthermore, the apparatus could include a $CO_2$ recharging system to account for the $CO_2$ (and pressure) loss that occurs when the sub-chamber is vented to atmosphere.

A $CO_2$ recharging system could include a small gas cylinder with suitable regulation. Such a cylinder could be hidden within the main container pack.

Sub-chamber 12 as illustrated is a component that can be cleaned and used multiple times. Main container 11 can be replaced with a full beverage container. In such cases it is inevitable that the container will be exposed to atmosphere once, on opening, but then remains sealed via the sub-chamber interface until empty.

Further embodiments may be a single-use integrated design of a main container with a sub-chamber such as by a snap-fit closure 15. Alternatively, a "Grolsch (RTM)"-like closure using a levered stopper system or bayonet fitting could be used instead of a thread.

Figure 3:
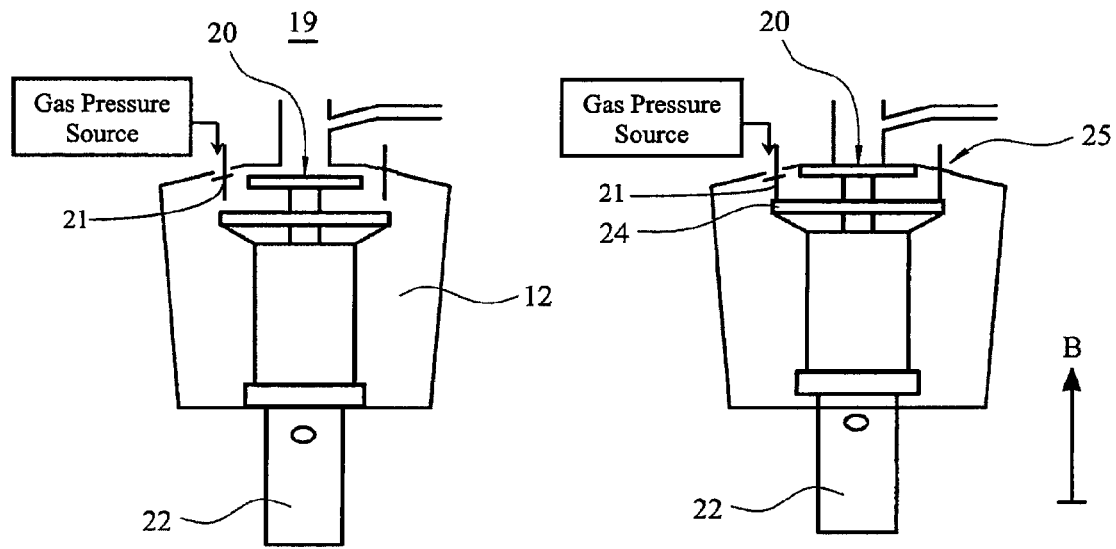
FIGS. 3.1 to 3.4 show a schematic view of operation of an apparatus according to a second embodiment.
Figure 3:
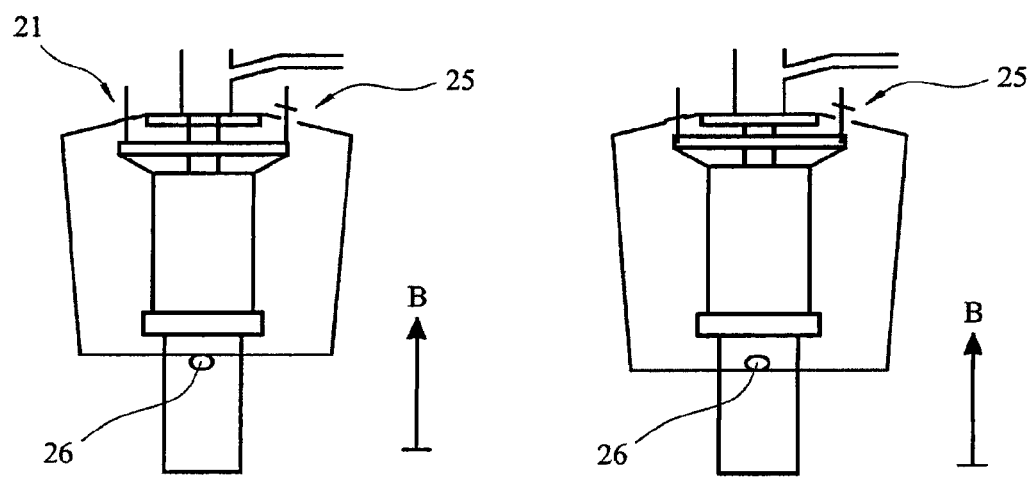

A second embodiment of the invention is described with reference to FIGS. 3 to 6 wherein the stages of operation are best shown by FIGS. 3.1 to 3.4. The general form of the apparatus according to the second embodiment is an "Optic" to be used with an inverted bottle of carbonated spirit.

Referring to FIG. 3.1, the apparatus is in a state where it is connected to a bottle at its upper end 19 and a valve 20 is open. As such chamber 12 will be filled with beverage from the bottle. A transfer valve 21 is also open to a gas pressure source (FIGS. 3.1 and 3.2) at high pressure (relative to atmosphere) thereby maintaining gas in solution. The entire apparatus system is closed to atmosphere.

To pour a drink from chamber 12 nozzle 22 is pushed upward in the direction of arrow B. Referring to FIG. 3.2 valve 20 seals against the mouth of the opening between the bottle and the chamber 12, closing off liquid flow from the inverted bottle (not shown). Chamber 12 is isolated from the bottle (container 11). An annular collar 24 extending from nozzle body 22 comes into engagement with transfer valve 21 and a vent valve 25, but neither are acted upon (yet).

Referring to FIG. 3.3 transfer valve 21 closes (by virtue of collar 24) and vent valve 25 opens (e.g. 0.1 bar pressure $CO_2$). The pressure in chamber 12 therefore drops but it is still isolated from atmosphere. Nozzle 22 continues to move in direction B. Valve 20 is compressed and remains closed.

Referring to FIG. 3.4, an outlet hole 26 formed in nozzle 22 moves into chamber 12 to open it to atmosphere. Beverage flows out of the chamber at a low $CO_2$ pressure. Valves 20 and 21 remain closed. Valve 25 is open.

Refilling the Optic apparatus follows the reverse process, namely FIGS. 3.4 to 3.1. At FIG. 3.2 vent valve 25 closes, valve 20 remains closed and transfer valve 21 opens to pressurise chamber 12, e.g. to 2.5 bar, before valve 20 is opened at the stage of FIG. 3.1 and gravity fills the Optic with beverage.

As with the first embodiment, chamber 12 is pre-pressurised via valve 21 before carbonated beverage is introduced thereby minimising gas breakout during filling of the optic. Furthermore, prior to dispense, chamber 12 is isolated from the main container 11 (or bottle). Thus no or minimal gas is lost from the system.

Figure 4:
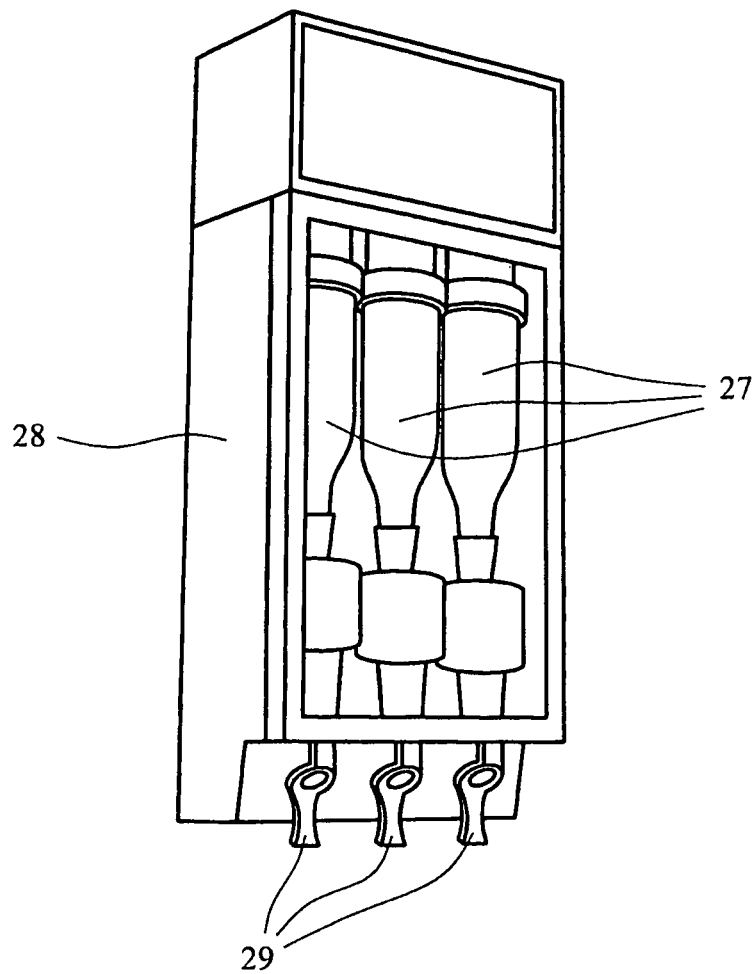
FIG. 4 illustrates a general overview of a commercial device that utilises the invention.

The operation of an apparatus according to the second embodiment is best applied to a commercial operation because (ideally) a gas supply is required. FIG. 4 illustrates an overview of a commercial device incorporating the invention wherein three bottles of carbonated beverage 27 are mounted in an inverted state in a cabinet 28. Three dispensers 29 of a familiar looking type dispense measures of beverage via a sub-chamber 12 according to the invention. The cabinet 28 is refrigerated and sealed, not only to preserve temperature but as a safety feature against a bottle breakage.

Figure 5:
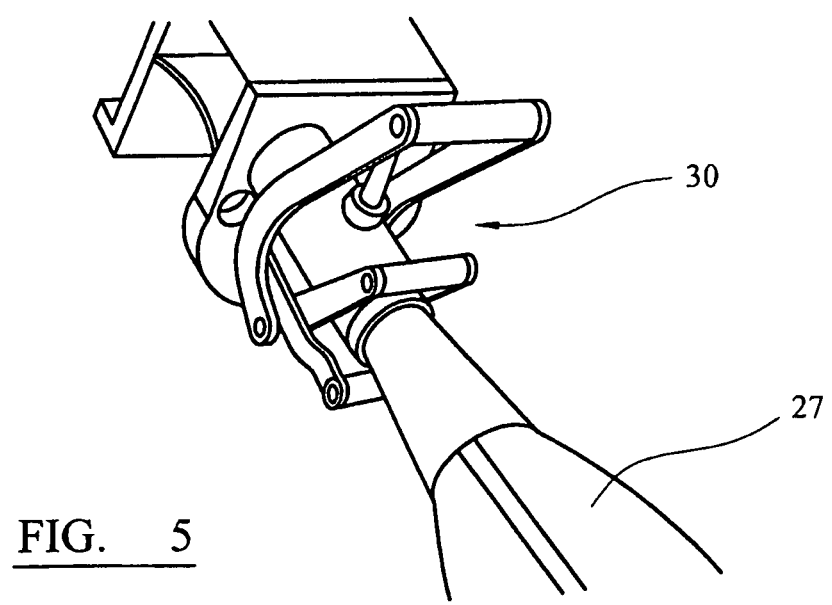
FIG. 5 illustrates details of the commercial device of FIG. 4.

FIG. 5 illustrates a bottle gripping mechanism 30 of the device from FIG. 4, prior to inversion of a bottle 27. A gripping mechanism 30 is required due to the pressures within the device, thereby maintaining a seal between the bottle 27 and sub-chamber 12.

Figure 6:
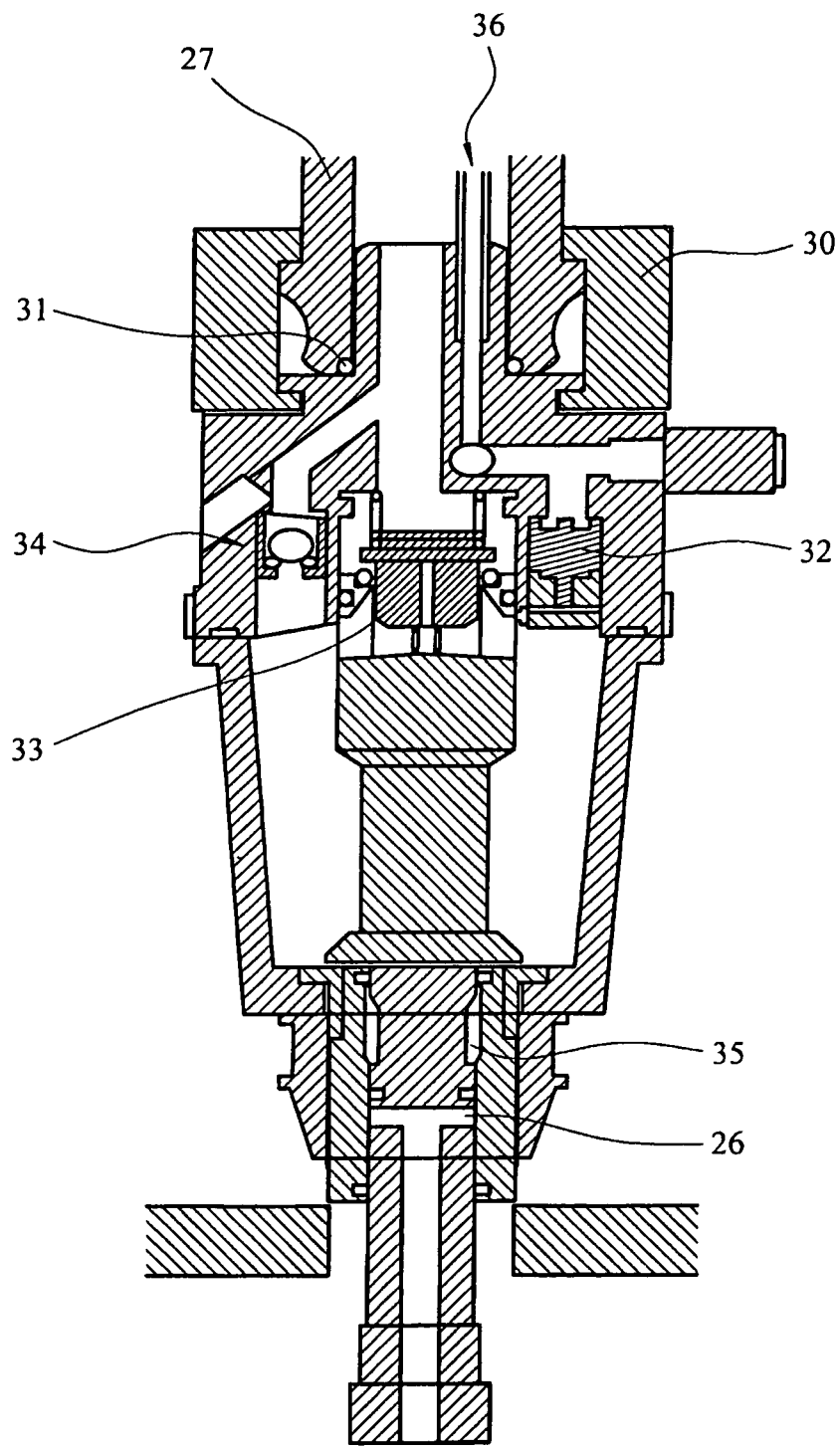
FIG. 6 shows a cross section of an apparatus according to the second embodiment of the invention.

FIG. 6 is a cross section view of an apparatus according to the invention, as used in a commercial (as opposed to take-home) form of the invention as shown in FIG. 4.

Referring to FIG. 6 the sub-chamber 12 is able to withstand the pressure required to maintain equilibrium of a highly carbonated product. The carbonation levels of the product could be similar to champagne, i.e. 12 g/L, but the range of carbonation for which the sub-chamber is designed is 6 g/L (a 12 g/L product, stored at 4° C. will require 3.2 barg $CO_2$ top pressure to maintain equilibrium).

The apparatus locks onto or grabs the neck of a bottle 27 via grip 30 (illustrated by FIG. 5). Liquid is carbonated and as such the dispense mechanism provides for a pressurised headspace to maintain the carbonation. The apparatus holds or grabs the bottle so as to prevent the pressure in the pack causing it to lift off a seal 31 and leak (without it this would result in product loss or product quality loss).

The apparatus includes a $CO_2$ bleed valve 32 that fills chamber 12 with $CO_2$ as the product is dispensed. The bleed valve 32 is a low-pressure valve, set at just above atmospheric pressure, i.e. 0.1 barg or alternatively a higher pressure valve, i.e. 2 barg, with low gas flow rate. The $CO_2$ flow rate is similar to the liquid flow from a conventional optic, because if the $CO_2$ flow rate is too low, a partial vacuum could be formed during the dispense operation, which would result in $CO_2$ loss from the product. Conversely if the $CO_2$ flow rate is too fast, it will force the product out of the chamber 12 during dispense, which in turn will result in $CO_2$ loss from the liquid. The $CO_2$ bleed valve 32 is able to facilitate the chamber emptying rate, to ensure optimal dispense speed and thus minimise gas loss from the product. It also prevents an "air lock" that might stop the optic from emptying.

The apparatus has an equalisation valve 33 between the bottle and the sub-chamber 12. This equalisation valve only opens once the pressure in the bottle and the optic is equalised. $CO_2$ is used to equalise the pressure in the chamber. Once the valve 33 has opened, liquid is able to flow from the bottle into the chamber under gravity. As the pressure in the bottle and chamber is equal, no gas should be lost from the product. The equalisation valve thus helps to maintain product quality, by allowing the chamber to be filled without any carbonation-loss from the liquid.

A transfer valve 34 allows $CO_2$ to flow from the chamber 12 back to the bottle 27. Once the empty chamber 12 is pressurised with $CO_2$ the equalisation valve 33 opens and the chamber is filled with liquid from the bottle. The gas in the chamber is released to the bottle via the transfer valve 34. This valve is closed during dispense and only opens once the pressure in the chamber and bottle is equalised and liquid has started flowing.

When full of liquid the pressure in the chamber 12 is equal to the pressure in the bottle. To dispense the liquid with minimal gas loss, the pressure in the chamber is reduced to atmospheric pressure. This is achieved with the opening of an expansion chamber 35 during the dispense cycle. The expansion chamber 35 opens during the dispense cycle, after the chamber has been isolated from the bottle. By opening the expansion chamber, the internal volume of the chamber 12 increases, thereby reducing the internal pressure. This can also be achieved by a piston that is moved out of the liquid chamber, thereby increasing the internal volume and thus reducing the pressure.

The "Optic unit" of the invention is sealed to prevent the escape of pressurised gas or product, except when required during normal operation. Hermetically sealing the optic also prevents the ingress of air, specifically oxygen, and enables manipulation of the pressure inside thus providing the ability to control dispense of the product and deliver a quality product to a glass.

The optic unit is able to vent the pressure in the bottle before the end user is able to handle the bottle for reloading. This is a safety feature; as a glass bottle with a large pressurised headspace can be dangerous. This is achieved via dip-tube 36. The same dip tube 36 is used to pressurise the bottle 27.

Within cabinet 28 the bottles 27 are loaded into individual cradles (not shown), which is a safety enclosure that surrounds the bottle (in a multi-bottle cabinet, each bottle will have its own enclosure). This feature allows only the bottle that needs to be handled to be vented. The remaining bottles remain pressurised, thus maintaining quality and ensuring the user is being exposed to minimal risk. The bottle cradle also facilitates bottle loading.

Bottles are loaded, via a cradle, into cabinet 28 by a swivel action. Therefore, the optic unit, along with the bottle cradle and the gas connections are able to pivot out of the cabinet. The pivot action typically allows 135° movement. This makes loading and unloading of the bottle easier and also ensures that the user cannot handle a pressurised bottle.

The swivel has a lock that locks the cradle in a closed position while the bottle is pressurised. For a cradle to be opened, the pressure first needs to be vented from the bottle before the lock disengages and allows the cradle to open. This is achieved via a pin that retracts once the bottle is vented, thus allowing the cradle to open.

The swivel action is dampened to slow the opening and closing of the cradle. As the bottles are heavier than standard bottles, in order to withstand the pressure of carbonation, the dampening is a safety feature.

During filling of the chamber 12, $CO_2$ bubbles can form within it, which is undesirable. As this is not normally a requirement or specification for a conventional optic, the problem can be solved by applying coatings on the inside of the liquid chamber or by having a highly polished surface or by the use of hydrophopic or hydrophilic coatings, or any other such techniques so as to prevent bubble formation within the optic (sub-chamber 12). As temperature has a significant impact on the solubility of $CO_2$ in the product and thus the pressure required to maintain equilibrium, the entire apparatus is housed in a refrigerated cabinet 28. Lower pressures are required to maintain the equilibrium at lower temperatures.

If no bottle is loaded in one of the cradles, the $CO_2$ flow to that chamber is shut off, while the remaining chambers have normal gas supply. This is achieved by a bottle detector switch.

A gas fuse shuts off gas flow if it detects high gas flow. This fuse shuts off the gas flow if one of the bottles breaks or has a significant leak and therefore prevents excessive amounts of $CO_2$ being released into a bar environment.

Each of the embodiments performs an equivalent function, the core aspect being that the sub-chamber is in a state to receive carbonated beverage without permitting a pressure drop that would cause gas to breakout of solution.

This pressure control aspect maintains quality of the product as it is dispensed. Maintaining quality in this way is not possible with conventional Optic dispensers.

INDUSTRIAL APPLICABILITY

The present invention has been developed primarily for a carbonated spirit product that would be required in a "shot" measure (e.g. 25 mL) like a normal (uncarbonated) neat spirit. Beverages applicable to the invention also include Champagne, sparkling wine, malt beverages etc.

The principle has application in all carbonated beverages or such other "fizzy" drinks that include other gases in solution, such as nitrogen. Furthermore, the sub-chamber 12 could be scaled to a volume of a larger glass with a volume of, for example, 250 mL.

Production is possible using available technology and materials.

The invention claimed is:

1. An apparatus for dispensing a carbonated beverage including a sub-chamber adapted to communicate with a main container via a first valve; further including a gas pressure source connected with a transfer valve to, in use, pressurize the sub-chamber to an internal pressure greater than or equal to an equilibrium pressure required to keep dissolved gas in solution, prior to filling with beverage such that the dissolved gas remains in solution in the main container; wherein, in use, when the sub-chamber is filled, the first valve closes and a vent valve is opened to reduce pressure in the sub-chamber after filling such that dispensed beverage is not dispensed at the internal pressure greater than or equal to the equilibrium pressure.

2. The apparatus of claim 1 wherein, prior to being opened for dispense, the sub-chamber is vented.

3. The apparatus of claim 1 wherein the sub-chamber includes a screw-top lid.

4. The apparatus of claim 1 wherein the sub-chamber includes a groove so as to trap an air pocket when it is inverted.

5. The apparatus of claim 1 wherein the sub-chamber includes an outlet valve.

6. The apparatus of claim 1 wherein, in use, prior to filling the sub-chamber, the sub-chamber is pressurized to the same pressure as a headspace of the main container.

7. The apparatus of claim 1 incorporated into an optic device for dispensing a measure of beverage.

8. The apparatus of claim 1, housed in a refrigerated cabinet.

9. The apparatus of claim 1 wherein the main container is connected and held to the sub-chamber by a clamp, threaded closure, snap-fit, bayonet fitting, or levered stopper arrangement.

10. A method of dispensing a carbonated beverage including the steps of pre-pressurizing a sub-chamber to an internal pressure greater than or equal to an equilibrium pressure required to keep dissolved gas of the beverage in solution by a gas pressure source via a transfer valve, opening communication between the sub-chamber and a main container containing the beverage, then closing communication between the sub-chamber and the main container, opening a vent to reduce pressure in the sub-chamber, and then dispensing beverage from the sub-chamber.

* * * * *